us009491153B2

(12) United States Patent
Elliott (10) Patent No.: US 9,491,153 B2
(45) Date of Patent: Nov. 8, 2016

(54) WIFI OPPORTUNISTIC KEY CACHING OVER NON-WIFI ACCESS

(71) Applicant: Brent J. Elliott, Hillsboro, OR (US)

(72) Inventor: Brent J. Elliott, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 27 days.

(21) Appl. No.: 14/227,052

(22) Filed: Mar. 27, 2014

(65) Prior Publication Data

US 2015/0281194 A1   Oct. 1, 2015

(51) Int. Cl.
*H04L 29/06* (2006.01)
*H04W 12/06* (2009.01)
*H04W 36/00* (2009.01)

(52) U.S. Cl.
CPC .............. *H04L 63/08* (2013.01); *H04W 12/06* (2013.01); *H04W 36/0038* (2013.01)

(58) Field of Classification Search
CPC .................................................. H04L 63/0853
USPC ............................................................. 726/7
See application file for complete search history.

(56) References Cited

U.S. PATENT DOCUMENTS

| 2003/0084287 A1* | 5/2003 | Wang | H04L 63/08 713/168 |
| 2007/0256135 A1* | 11/2007 | Doradla | H04L 63/101 726/26 |
| 2009/0240940 A1* | 9/2009 | Shoemake | H04W 12/12 713/168 |

* cited by examiner

*Primary Examiner* — Jason K Gee
(74) *Attorney, Agent, or Firm* — Sutherland Asbill & Brennan LLP (57) ABSTRACT

This disclosure describes systems, methods, and computer-readable media related to WiFi opportunistic key caching over non-WiFi access. In some embodiments, data may be received from a user device over a non-WiFi network connection. The data may include authentication credentials for a WiFi network connection and a location associated with the user device. One or more access points may be identified based at least in part on the location associated with the user device. Information associated with the user device and the authentication credentials may be transmitted to the identified one or more access points. Authentication of the user device with at least one of the identified one or more access points may be facilitated.

18 Claims, 4 Drawing Sheets

WIFI OPPORTUNISTIC KEY CACHING OVER NON-WIFI ACCESS

BACKGROUND

Many user devices, such as smartphones or tablets, have the ability to wirelessly connect to a network, permitting users to physically move while staying connected. In order to stay connected, the user devices may enter and exit the range of individual WiFi access points. As the user device transitions between access points, it may need to perform scanning and signaling to select, authenticate, and associate itself with the new WiFi access points, which may have an adverse effect on performance and connectivity. For example, the user device may initiate authentication every time the user of the user device connects to a new access point. Such authentication requires time for connection with or transitioning between access points, which may impact the end-user experience, particularly in the case of real-time applications such as voice and video conferencing.

BRIEF DESCRIPTION OF THE DRAWINGS

The detailed description is set forth with reference to the accompanying drawings. The use of the same reference numerals indicates similar or identical components or elements; however, different reference numerals may be used as well to indicate components or elements which may be similar or identical. Various embodiments of the disclosure may utilize elements and/or components other than those illustrated in the drawings, and some elements and/or components may not be present in various embodiments. Depending on the context, singular terminology used to describe an element or a component may encompass a plural number of such elements or components and vice versa.

DETAILED DESCRIPTION

This disclosure relates to, among other things, systems, methods, computer-readable media, techniques and methodology for WiFi opportunistic key caching over non-WiFi access. A mechanism referred to as Opportunistic Key Caching may enable the opportunistic caching of keys into mobile device WiFi subsystems so that authentications may be more efficient. Within this disclosure, Opportunistic Key Caching shall be used to refer to a wide range of techniques by which keys or information about an active association can be used to accelerate establishment of a new association involving different devices. These mechanisms include but are not limited to Opportunistic Key Caching (or OKC), Pairwise Master Key Caching (or PMK Caching) which was defined in IEEE 802.11i, Fast BSS Transition which was defined in IEEE 802.11r, the Cisco defined CCKM mechanism for fast roaming, fast reassociation as defined for EAP-SIM/EAP-AKA/EAP-AKA' in RFC 4186/4187/5448, and other mechanisms whether standardized or proprietary. This disclosure is directed to methods and systems for delivering keys or other information needed to accelerate the authentication for WiFi access out of band by sending the information over non-WiFi networks, such as cellular networks. The systems and methods described herein may enable transmission of such data prior to the point of the selection of the new WiFi access point or in parallel with the selection and association with the target access point. The keys and/or information from the access points may be delivered and cached at the user device over the non-WiFi network. The keys and/or other information may include pairwise master keys, such as those employed via opportunistic key caching or other similar approaches.

In some embodiments, end-to-end security measures, including but not limited to encrypted encapsulation via IPSEC, may be utilized to transfer the keys and/or other information over trusted and/or untrusted non-WiFi networks. In some embodiments, the keys and/or other information to be delivered to the access point and/or user device may be filtered to reduce the amount of information to be transferred based on different factors that may include, but are not limited to, user device location, proximity, previous associations, movement associated with the user device, and the like. In some embodiments, the non-WiFi network may deliver keys and/or information associated with multiple extended service set (ESS) identifiers and/or networks.

Various illustrative embodiments have been discussed above. These and other example embodiments of the disclosure will be described in more detail hereinafter through reference to the accompanying drawings. The drawings and the corresponding description are provided merely for illustration and are not intended to limit the disclosure in any way. It should be appreciated that numerous other embodiments, variations, and so forth are within the scope of this disclosure.

Illustrative Use Cases and System Architecture

Figure 1:
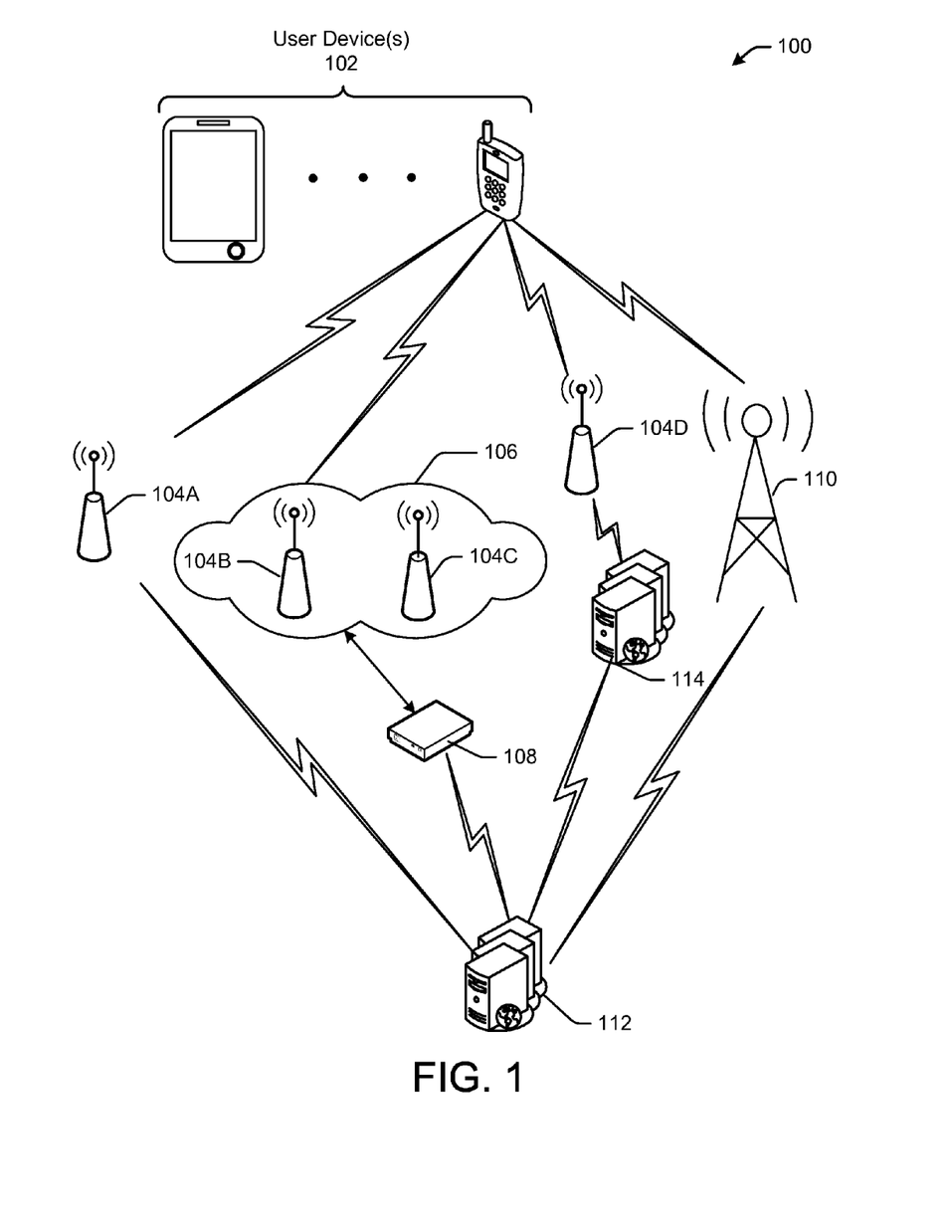
FIG. 1 depicts an illustrative data flow between various components of an illustrative system architecture for WiFi opportunistic key caching over non-WiFi access in accordance with one or more embodiments of the disclosure.

FIG. 1 depicts an illustrative architecture 100 of various components of a system for WiFi opportunistic key caching over non-WiFi access in accordance with one or more embodiments of the disclosure. One or more user device(s) 102, one or more access point(s) 104A-104C (collectively 104), a WiFi controller 108, and a cell tower 110 associated with a cellular network are illustratively depicted in FIG. 1. A user device 102 may be connected a wireless endpoint, which may include a wireless access point (e.g., wireless access point 104A), a WiFi controller (e.g. WiFi controller 108), and/or an authentication server (e.g., authentication server 114). The access point 104 may be in communication with an authentication coordinator 112. In some embodiments, a WiFi network 106 may be provided by one or more access points 104B, 104C. The access points 104B, 104C of the WiFi network 106 may be in communication with a WiFi controller 108. In some embodiments, the user device 102 may be in communication with an access point 104D that is associated with an authentication server 114, which may in turn be in communication with the WiFi controller 108. In some embodiments, an authentication server 114 may manage authentication and access to access points by user devices 102. In some embodiments, the user device 102 may also be connected with a cellular network via a cellular tower 110. The cellular tower 110 may be in communication with the authentication coordinator 112.

The one or more access point(s) 104 may provide a WiFi coverage area specified by the location of the access points 104. Each access point 104 may be configured with a unique identifier (e.g., MAC address). Access point(s) 104 may be configured to receive information from the authentication coordinator 112, authentication keys, credentials, and/or information (e.g., private keys) associated with a user device 102, and/or information associated with the user device 104.

In some embodiments, a user device 102 may be connected to a WiFi access point 104A. The user of the user device may be traveling and may be moving away from the WiFi coverage area provided by WiFi access point 104A. The user device 102 may establish a secure connection with the cellular tower 110 of a cellular network and transmit data, such as authentication keys, credentials, and/or information (e.g., private keys) and/or location information, and/or information such as signal measurements or proximity readings which may be used to determine the user device 102 location to an authentication coordinator 112 via the cellular tower 110. The authentication coordinator 112 may process the information received from the user device 102 and determine that the user device 102 is moving away from the WiFi coverage area provided by 104A and moving closer to the WiFi network 106 provided by WiFi access points 104B, 10C. The authentication coordinator may determine and/or predict the user device 102 will be connecting to the WiFi network 106 and may transmit authentication keys, credentials, and/or information and information associated with the user device 102 to the WiFi controller 108 associated with the WiFi network 106. The WiFi controller 108 may transmit the authentication keys, credentials, and/or information and information to the access points 104B, 104C. In some embodiments, the WiFi controller 108 may transmit a key to the authentication coordinator 112 to transmit (e.g., over the cellular network) to the user device 102 to facilitate authentication of the user device 102 to the identifier WiFi network 106.

The user device(s) 102 may include any suitable processor-driven computing device capable of WiFi and non-WiFi access, including, but not limited to, tablet computing devices, electronic book (e-book) readers, netbook computers, notebook computers, laptop computers, Ultrabook™ computers, personal digital assistants (PDA), smart phones, web-enabled televisions, video game consoles, set top boxes (STB), digital video recorder (DVR) systems, combinations thereof, or the like. For ease of explanation, the user device(s) 102 may be described herein in the singular; however, it should be appreciated that multiple user device(s) 102 may be provided.

The WiFi access points 104 may include any suitable processor-driven computing device capable of providing WiFi access to one or more user device(s) 102. For ease of explanation, the WiFi access point(s) 104 may be described herein in the singular; however, it should be appreciated that multiple WiFi access point(s) 104 may be provided.

The WiFi controller 108 may include any suitable processor-driven computing device capable of managing one or more WiFi access points 104 In some embodiments, the functionality of a WiFi controller 108 may be integrated into a WiFi access point 104. For ease of explanation, the WiFi controller 108 may be described herein in the singular; however, it should be appreciated that multiple WiFi controller 108 may be provided.

The authentication coordinator 112 may include any suitable processor-driven computing device including, but not limited to, a desktop computing device, a laptop computing device, a server, a smartphone, a tablet, and so forth. For ease of explanation, the authentication coordinator 112 may be described herein in the singular; however, it should be appreciated that multiple registration servers 108 may be provided.

Figure 2:
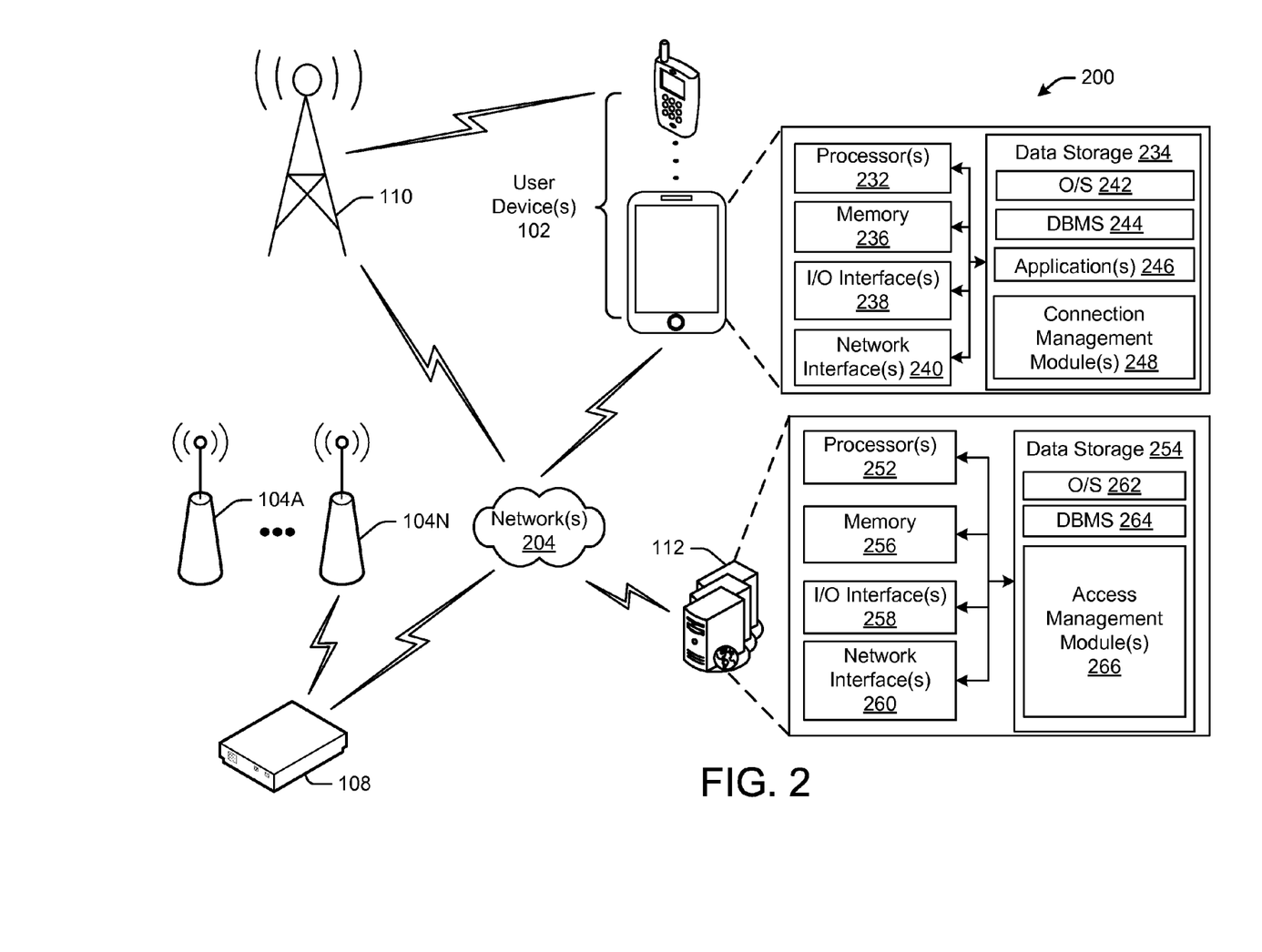
FIG. 2 is a block diagram including various hardware and software components of the illustrative system architecture depicted in FIG. 1 in accordance with one or more embodiments of the disclosure.

FIG. 2 is a block diagram including various hardware and software components of the illustrative system architecture depicted in FIG. 1 in accordance with one or more embodiments of the disclosure. The illustrative architecture 200 may include one or more user device(s) 102, one or more access point(s) 104, one or more WiFi controllers(s) 108, cellular tower(s) 110, and/or one or more authentication coordinator(s) 112. The user device(s) 102, WiFi access point(s) 104, WiFi controller(s) 108, cellular tower(s) 110, and/or authentication coordinator(s) 112 may include any of the types of devices described through reference to FIG. 1.

Any of the user device(s) 102, one or more access point(s) 104, one or more WiFi controllers(s) 108, cellular tower(s) 110, and/or one or more authentication coordinator(s) 112 may be configured to communicate with each other and any other component of the architecture 200 via one or more network(s) 204. The network(s) 204 may include, but are not limited to, any one or a combination of different types of suitable communications networks such as, for example, cable networks, public networks (e.g., the Internet), private networks, wireless networks, cellular networks, or any other suitable private and/or public networks. Further, the network(s) 204 may have any suitable communication range associated therewith and may include, for example, global networks (e.g., the Internet), metropolitan area networks (MANs), wide area networks (WANs), local area networks (LANs), wireless personal area networks (WPANs), or personal area networks (PANs). In addition, the network(s) 204 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, satellite communication mediums, or any combination thereof.

Any of the user device(s) 102, one or more access point(s) 104, one or more WiFi controllers(s) 108, cellular tower(s) 110, and/or one or more authentication coordinator(s) 112 may include one or more communications antennae. Communications antenna may be any suitable type of antenna corresponding to the communications protocols used by the user device(s) 102, one or more access point(s) 104, one or more WiFi controllers(s) 108, cellular tower(s) 110, and/or one or more authentication coordinator(s) 112. Some non-limiting examples of suitable communications antennas include Wi-Fi antennas, IEEE 802.11 family of standards compatible antennas, directional antennas, non-directional antennas, dipole antennas, folded dipole antennas, patch antennas, multiple-input multiple-output (MIMO) antennas, or the like. The communications antenna may be communicatively coupled to a radio component to transmit and/or receive signals, such as communications signals to and/or from the user devices 108.

Any of the user device(s) 102, one or more access point(s) 104, one or more WiFi controllers(s) 108, cellular tower(s) 110, and/or one or more authentication coordinator(s) 112 may include transmit/receive (transceiver) or radio components may include any suitable radio and/or transceiver for transmitting and/or receiving radio frequency (RF) signals in the bandwidth and/or channels corresponding to the communications protocols utilized by any of the user device(s) 102, one or more access point(s) 104, one or more WiFi controllers(s) 108, cellular tower(s) 110, and/or one or more authentication coordinator(s) 112 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g. 802.11b, 802.11g, 802.11n), 5 GHz channels (e.g. 802.11n, 802.11ac), or 60 GHZ channels (e.g. 802.11ad). In some embodiments, non-Wi-Fi protocols may be used for communications between devices, such as Bluetooth, dedicated short-range communication (DSRC), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The user device(s) 102 may include one or more processors (processor(s)) 232 and one or more memories 236 (referred to herein generically as memory 236). The processor(s) 232 may include any suitable processing unit capable of accepting digital data as input, processing the input data based on stored computer-executable instructions, and generating output data. The computer-executable instructions may be stored, for example, in the data storage 234 and may include, among other things, operating system software and application software. The computer-executable instructions may be retrieved from data storage 234 and loaded into memory 236 as needed for execution. The processor(s) 232 may be configured to execute the computer-executable instructions to cause various operations to be performed. The processor(s) 232 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 234 may store program instructions that are loadable and executable by the processor(s) 232, as well as data manipulated and generated by the processor(s) 232 during execution of the program instructions. The program instructions may be loaded into memory 236 as needed for execution. Depending on the configuration and implementation of the user device(s) 102, the memory 236 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 236 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The user device(s) 102 may further include additional data storage 234 such as removable storage and/or non-removable storage including, but not limited to, magnetic storage, optical disk storage, and/or tape storage. Data storage 234 may provide non-volatile storage of computer-executable instructions and other data. The memory 236 and/or the data storage 234, removable and/or non-removable, are examples of computer-readable storage media (CRSM).

The user device(s) 108 may further include network interface(s) 240 that facilitate communication between the user device(s) 102 and other devices of the illustrative system architecture 200 or application software via the network(s) 204. The user device(s) 102 may additionally include one or more input/output (I/O) interfaces 238 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 234, various program modules, applications, or the like, may be stored therein that may comprise computer-executable instructions that when executed by the processor(s) 232 cause various operations to be performed. The memory 236 may have loaded from the data storage 234 one or more operating systems (O/S) 242 that may provide an interface between other application software (e.g., dedicated applications, a browser application, a web-based application, a distributed client-server application, etc.) executing on the user device 102 and the hardware resources of the user device 102. More specifically, the O/S 242 may include a set of computer-executable instructions for managing the hardware resources of the user device(s) 102 and for providing common services to other application programs (e.g., managing memory allocation among various application programs). The O/S 242 may include any operating system now known or which may be developed in the future including, but not limited to, any mobile operating system, desktop or laptop operating system, mainframe operating system, or any other proprietary or open-source operating system.

The data storage 234 may further include one or more database management systems (DBMS) 244 for accessing, retrieving, storing, and/or manipulating data stored in one or more datastores. The DBMS 244 may use any of a variety of database models (e.g., relational model, object model, etc.) and may support any of a variety of query languages.

The data storage 234 may additionally include various other program modules that may include computer-executable instructions for supporting a variety of associated functionality. For example, the data storage 234 may include one or more application(s) 246 and/or one or more connection management module(s) 248.

The application(s) 246 may include computer-executable instructions that in response to execution by the processor(s) 232 cause operations to be performed including different application-specific functionality, such as accessing emails, providing video and/or audio conferencing capabilities, browsing the Internet, and the like.

The connection management module(s) 248 may include computer-executable instructions that in response to execution by the processor(s) 232 cause operations to be performed including collecting location information, such as signal strength associated with the user device 102, GPS data associated with a currently location of the user device, and the like. Additionally, the connection management module 248 may obtain, manage, and/or transmit authentication keys, credentials, and/or information for one or more WiFi networks provided by different access points 104. For example, the connection management module 248 may obtain and/or manage private keys associated with one or more WiFi access point(s) 104 to facilitate connection with the WiFi access point(s) 104. The connection management module(s) 248 may determine the user device 102 is about to leave a WiFi coverage area, establish a secure connection over a non-WiFi network, such as a cellular network, and/or transmit data to be used for opportunistic key caching over non-WiFi networks.

Within the data storage 234, one or more modules may be stored. As used herein, the term module may refer to a functional collection of instructions that may be executed by the one or more processors 232. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

The authentication coordinator(s) 112 may include one or more processors (processor(s)) 252 and one or more memories 256 (referred to herein generically as memory 256). The processor(s) 252 may include any suitable processing unit capable of accepting digital data as input, processing the input data based on stored computer-executable instructions, and generating output data. The computer-executable instructions may be stored, for example, in the data storage 254 and may include, among other things, operating system software and application software. The computer-executable instructions may be retrieved from data storage 254 and loaded into memory 256 as needed for execution. The processor(s) 252 may be configured to execute the computer-executable instructions to cause various operations to be performed. The processor(s) 252 may include any type of processing unit including, but not limited to, a central processing unit, a microprocessor, a microcontroller, a Reduced Instruction Set Computer (RISC) microprocessor, a Complex Instruction Set Computer (CISC) microprocessor, an Application Specific Integrated Circuit (ASIC), a System-on-a-Chip (SoC), a field-programmable gate array (FPGA), and so forth.

The data storage 254 may store program instructions that are loadable and executable by the processor(s) 252, as well as data manipulated and generated by the processor(s) 252 during execution of the program instructions. The program instructions may be loaded into memory 256 as needed for execution. Depending on the configuration and implementation of the authentication coordinator(s) 112, the memory 256 may be volatile memory (memory that is not configured to retain stored information when not supplied with power) such as random access memory (RAM) and/or non-volatile memory (memory that is configured to retain stored information even when not supplied with power) such as read-only memory (ROM), flash memory, and so forth. In various implementations, the memory 256 may include multiple different types of memory, such as various forms of static random access memory (SRAM), various forms of dynamic random access memory (DRAM), unalterable ROM, and/or writeable variants of ROM such as electrically erasable programmable read-only memory (EEPROM), flash memory, and so forth.

The authentication coordinator(s) 112 may further include additional data storage 254 such as removable storage and/or non-removable storage including, but not limited to, magnetic storage, optical disk storage, and/or tape storage. Data storage 254 may provide non-volatile storage of computer-executable instructions and other data. The memory 256 and/or the data storage 254, removable and/or non-removable, are examples of computer-readable storage media (CRSM).

The authentication coordinator(s) 112 may further include network interface(s) 260 that facilitate communication between the authentication coordinator(s) 112 and other devices of the illustrative system architecture 200 (e.g., user device(s) 102, etc.) or application software via the network(s) 204. The authentication coordinator(s) 112 may additionally include one or more input/output (I/O) interfaces 258 (and optionally associated software components such as device drivers) that may support interaction between a user and a variety of I/O devices, such as a keyboard, a mouse, a pen, a pointing device, a voice input device, a touch input device, a display, speakers, a camera, a microphone, a printer, and so forth.

Referring again to the data storage 254, various program modules, applications, or the like, may be stored therein that may comprise computer-executable instructions that when executed by the processor(s) 252 cause various operations to be performed. The memory 256 may have loaded from the data storage 254 one or more operating systems (O/S) 262 that may provide an interface between other application software (e.g., dedicated applications, a browser application, a web-based application, a distributed client-server application, etc.) executing on the authentication coordinator(s) 112 and the hardware resources of the authentication coordinator(s) 112. More specifically, the O/S 262 may include a set of computer-executable instructions for managing the hardware resources of the authentication coordinator(s) 112 and for providing common services to other application programs (e.g., managing memory allocation among various application programs). The O/S 262 may include any operating system now known or which may be developed in the future including, but not limited to, any mobile operating system, desktop or laptop operating system, mainframe operating system, or any other proprietary or open-source operating system.

The data storage 254 may further include one or more database management systems (DBMS) 264 for accessing, retrieving, storing, and/or manipulating data stored in one or more datastores. The DBMS 264 may use any of a variety of database models (e.g., relational model, object model, etc.) and may support any of a variety of query languages.

The data storage 254 may additionally include various other program modules that may include computer-executable instructions for supporting a variety of associated functionality. For example, the data storage 254 may include one or more access management module(s) 266.

The access management module(s) 266 may include computer-executable instructions that in response to execution by the processor(s) 252 cause operations to be performed including receiving authentication data from one or more user device(s) 102 via a non-WiFi network such as a cellular network, processing the received data, identifying one or more access points for user device(s) 102 to transition to, based on location and preferences, and the like. The access management module(s) 226 may also be responsible for facilitating exchange of authentication information between identified access points 104 and the user device(s) 102 and facilitating a handover of a WiFi connection to minimize impact on the end-user experience of the user device 102.

Within the data storage 254, one or more modules may be stored. As used herein, the term module may refer to a functional collection of instructions that may be executed by the one or more processors 252. For ease of description, and not by way of limitation, separate modules are described. However, it is understood that in some implementations the various functions provided by the modules may be merged, separated, and so forth. Furthermore, the modules may intercommunicate or otherwise interact with one another, such that the conditions of one affect the operation of another.

Those of ordinary skill in the art will appreciate that any of the components of the architecture 200 may include alternate and/or additional hardware, software or firmware components beyond those described or depicted without departing from the scope of the disclosure. More particularly, it should be appreciated that software, firmware or hardware components depicted or described as forming part of any of the illustrative components of the architecture 200, and the associated functionality that such components support, are merely illustrative and that some components may not be present or additional components may be provided in various embodiments. While various program modules have been depicted and described with respect to various illustrative components of the architecture 200, it should be appreciated that functionality described as being supported by the program modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, firmware and/or hardware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional modules not depicted may be present and may support at least a portion of the described functionality and/or additional functionality. Further, while certain modules may be depicted and described as sub-modules of another module, in certain embodiments, such modules may be provided as independent modules.

Those of ordinary skill in the art will appreciate that the illustrative networked architecture 200 is provided by way of example only. Numerous other operating environments, system architectures, and device configurations are within the scope of this disclosure. Other embodiments of the disclosure may include fewer or greater numbers of components and/or devices and may incorporate some or all of the functionality described with respect to the illustrative architecture 200, or additional functionality.

Illustrative Processes

Figure 3:
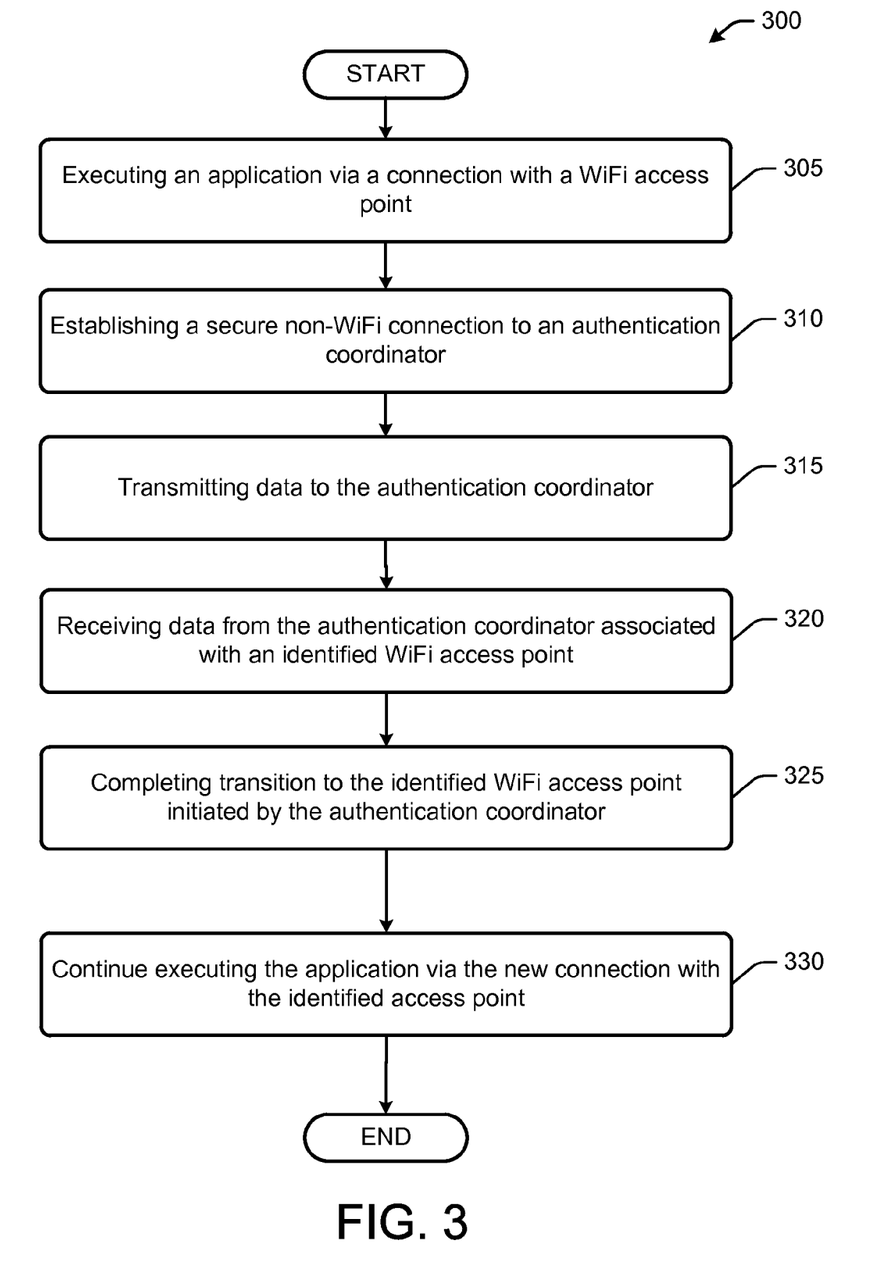
FIG. 3 is a process flow diagram of an illustrative method for WiFi opportunistic key caching over non-WiFi access in accordance with one or more embodiments of the disclosure.

FIG. 3 is a process flow diagram of an illustrative method 300 for WiFi opportunistic key caching over non-WiFi access in accordance with one or more embodiments of the disclosure. At block 305, an application 246 may be executing on the user device 102 via a connection with a WiFi access point 104. For example, the application 246 may be a video conferencing application connecting people using other user devices 102 via the WiFi network provided by the WiFi access point 104.

At block 310, the user device 102 may establish a connection with a non-WiFi connection (e.g., a cellular connection) with an authentication coordinator 112. In some embodiments, the connection management module 248 may detect and establish a connection with an available cellular network via a cellular tower 110. The established connection may be a secure non-WiFi connection to the authentication coordinator 112, including but not limited to, a secure tunnel or encrypted encapsulation via Internet Protocol security (IPSec).

At block 315, the connection management module 348 may transmit data to the authentication coordinator 112. In some embodiments, the data may include authentication keys, credentials, and/or information to access one or more WiFi access points 104, information associated with the user device 102 (e.g., device identifier), and/or location information associated with the user device 102 (e.g., signal strength of the user device 102 relative to an access point 104 and/or cellular network, or GPS information).

At block 320, the connection management module 248 may receive data from the authentication coordinator 112 associated with an identified WiFi access point 104. The data may be received over the secure non-WiFi network connection to the authentication coordinator 112. For example, the data associated with a WiFi access point 104 may include an identifier associated with the access point 104 and/or a private key the user device 102 may need to complete authentication with and transition to the access point 104.

At block 325, the connection management module 248 may complete the transition to the identified WiFi access point 104 initiated by the authentication coordinator 112. For example, the connection management module 248 may detect the WiFi access point 104 based on the information received from the authentication coordinator 112 over the non-WiFi network and may establish a connection with the access point 104. The user device 102 and the WiFi access point 104 may exchange data to complete the authentication of the user device 102 to the access point 104 and complete the transition from the previously associated WiFi access point 104 to the new access point 104 with minimal to no disruption in connection.

At block 330, the user application 246 may continue executing on the user device 102 via the newly established connection with the new WiFi access point 104 with minimal disruption to the end-user experience. The method described herein, for example, may allow a user to transition from one WiFi network to another without negatively impacting applications relying on WiFi access, such as a video conferencing application.

Figure 4:
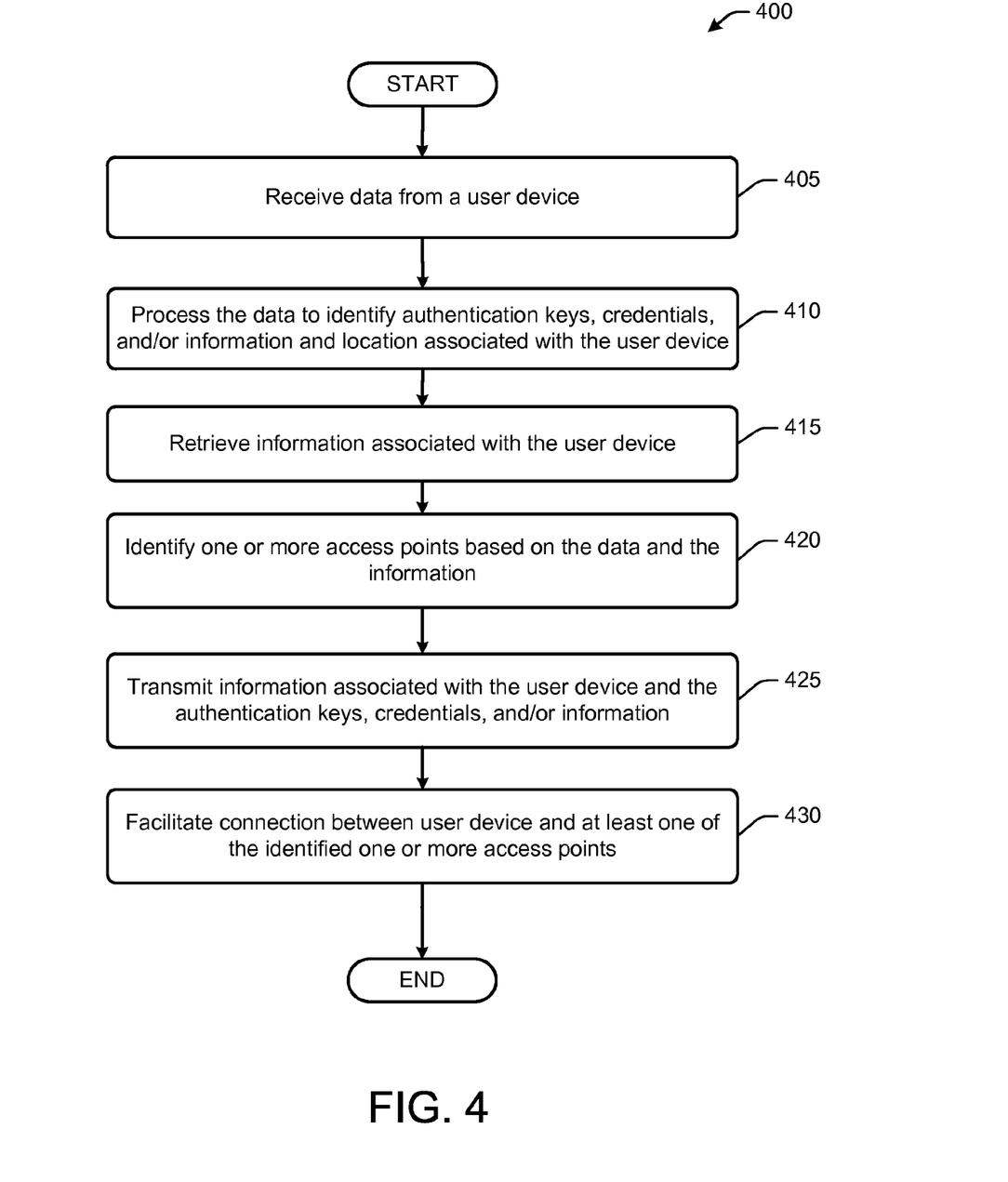
FIG. 4 is a process flow diagram of an illustrative method for WiFi opportunistic key caching over non-WiFi access in accordance with one or more embodiments of the disclosure.

FIG. 4 is a process flow diagram of an illustrative method 400 for WiFi opportunistic key caching over non-WiFi access in accordance with one or more embodiments of the disclosure. At block 405, an authentication coordinator 112 may receive data from a user device 102. In some embodiments, the access management module 266 may receive data over a secured non-WiFi connection (e.g., cellular network) from the user device 102. In some embodiments, the data may include user device identifiers (e.g., device identifier, account identifier, etc.), location information associated with the user device 102, and/or authentication keys, credentials, and/or information for WiFi access points 104.

At block 410, the access management module 266 may process to the received data to identify authentication keys, credentials, and/or information and location information associated with the user device 102. In some embodiments, the authentication keys, credentials, and/or information may be in the form of private keys or the like. Location information may include, but is not limited, signal strength information associated with the user device (e.g., for a known access point 104 and/or cellular network) to calculate or otherwise determine a current location and/or movement of a user device 102, GPS coordinates, or the like. In some embodiments, the access management module 266 may process the received data by filtering the data to reduce the amount of information to be transferred based on different factors that may include, but are not limited to, user device location, proximity, previous associations, movement associated with the user device 102, and the like. Filtering the data permits the access management module 266 to transmit less data to one or more access points 104, WiFi controllers 108, and/or user device(s) 102.

At block 415, the access management module 266 may retrieve information associated with the user device 102. For example, the access management module 266 may use device and/or account identifiers to retrieve preference data and/or prioritization rules associated with the user device 102. The information may be retrieved from a datastore, user device 102, or other computing device.

At block 420, the access management module 266 may identify one or more access points 104 and/or WiFi controllers 108 based at least in part on the data received from the user device 102 and/or information retrieved associated with the user device 102. In some embodiments, the access management module 266 may predict and/or identify possible access points 104 the user device 102 may encounter based on a current location and/or movement pattern received from the user device 102, prioritization rules associated with the user device 102 (e.g., prioritization rules may indicate a hierarchy of WiFi access points 104 to connect to if multiple are available or specify access points to avoid due to low signal quality or the like), previous behavior patterns, or the like.

At block 425, the access management module 266 may transmit information associated with the user device 102 and the authentication keys, credentials, and/or information to the identified access points 104 (e.g., over a secure connection between the authentication controller 112 and the identified access points 104). In some embodiments, the access management module 266 may transmit, via the secured non-WiFi connection, one or more authentication keys, credentials, and/or information associated with the identified WiFi access points 104 to the user device 102, such as a private key.

At block 430, the access management module 266 may facilitate connection between the user device 102 and at least one of the identified one or more access points 104. For example, the access management module 266 may transmit information necessary for the user device 102 and/or the access point 104 to begin to establish a connection and may facilitate exchange of authentication information to aid in the transition of the user device 102 from one WiFi network 106 to another without losing connectivity.

In one embodiment, a computer-readable medium may store computer-executable instructions which, when executed by a processor, cause the processor to perform operations including receiving, from a user device, data via a non-WiFi network connection, wherein the data comprises authentication credentials for a WiFi network connection and a location associated with the user device; identifying one or more wireless endpoints based at least in part on the location associated with the user device, wherein the one or more wireless endpoints comprise one or more access points, one or more WiFi controllers, or one or more authentication servers; transmitting to the identified one or more access points, information associated with the user device and the authentication credentials; and facilitating authentication of the user device with at least one of the identified one or more access points.

In one aspect of an embodiment, the non-WiFi network may be a cellular network. In one aspect of an embodiment, the location associated with the user device may be determined based at least in part on a signal strength associated with the user device or GPS data received from the user device. In one aspect of an embodiment, operations may include filtering the data received from the user device based on at least one of the location associated with the user device, proximity to the user device, previous associations with the user device, or movements associated with the user device. In one aspect of an embodiment, the non-WiFi connection may be established via a secure tunnel. In one aspect of an embodiment, the operations may include encrypting the information associated with the user device and the authentication credentials prior to transmitting to the identified one or more access points.

In one aspect of an embodiment, identifying the one or more access points based at least in part on the location associated with the user device may further include retrieving user preferences associated with the mobile device; retrieving one or more prioritization rules associated with the mobile device; and identifying the one or more access points based at least in part on the location associated with the user device, the user preferences, and the one or more prioritization rules.

In another embodiment, a computer-implemented method may be provided. The computer-implemented method may include receiving, by a server comprising one or more processors from a user device, data via a non-WiFi network connection, wherein the data comprises authentication credentials for a WiFi network connection and a location associated with the user device; identifying, by the server, one or more wireless endpoints based at least in part on the location associated with the user device, wherein the one or more wireless endpoints comprise one or more access points, one or more WiFi controllers, or one or more authentication servers; transmitting, by the server, to the identified one or more access points, information associated with the user device and the authentication credentials; and facilitating, by the server, authentication of the user device with at least one of the identified one or more access points.

In one aspect of an embodiment, the non-WiFi network may be a cellular network. In one aspect of an embodiment, the location associated with the user device may be determined based at least in part on a signal strength associated with the user device or GPS data received from the user device. In one aspect of an embodiment, the method may further include filtering, by the server, the data received from the user device based on at least one of the location associated with the user device, proximity to the user device, previous associations with the user device, or movements associated with the user device. In one aspect of an embodiment, the non-WiFi connection may be established via a secure tunnel. In one aspect of an embodiment, the method may further include encrypting, by the server, the information associated with the user device and the authentication credentials prior to transmitting to the identified one or more access points. In one aspect of an embodiment, identifying the one or more access points based at least in part on the location associated with the user device may further include retrieving, by the server, user preferences associated with the mobile device; retrieving, by the server, one or more prioritization rules associated with the mobile device; and identifying, by the server, the one or more access points based at least in part on the location associated with the user device, the user preferences, and the one or more prioritization rules.

In another embodiment, a system may be provided. The system may include at least one antenna; at least on transceiver; at least one memory storing computer-executable instructions; and at least one processor, wherein the at least one processor is configured to access the at least one memory and to execute the computer-executable instructions to receive, from a user device, data via a non-WiFi network connection, wherein the data comprises authentication credentials for a WiFi network connection and a location associated with the user device; identify one or more wireless endpoints based at least in part on the location associated with the user device, wherein the one or more wireless endpoints comprise one or more access points, one or more WiFi controllers, or one or more authentication servers; transmit to the identified one or more access points, information associated with the user device and the authentication credentials; and facilitate authentication of the user device with at least one of the identified one or more access points.

In one aspect of an embodiment, the non-WiFi network may be a cellular network. In one aspect of an embodiment, the location associated with the user device may be determined based at least in part on a signal strength associated with the user device or GPS data received from the user device. In one aspect of an embodiment, the at least one processor may be configured to access the at least one memory and to execute the computer-executable instructions to filter the data received from the user device based on at least one of the location associated with the user device, proximity to the user device, previous associations with the user device, or movements associated with the user device. In one aspect of an embodiment, the non-WiFi connection may be established via a secure tunnel. In one aspect of an embodiment, the at least one processor may be configured to access the at least one memory and to execute the computer-executable instructions to encrypt the information associated with the user device and the authentication credentials prior to transmitting to the identified one or more access points. In one aspect of an embodiment, to identify the one or more access points based at least in part on the location associated with the user device, the at least one processor is configured to access the at least one memory and to execute the computer-executable instructions to retrieve user preferences associated with the mobile device; retrieve one or more prioritization rules associated with the mobile device; and identify the one or more access points based at least in part on the location associated with the user device, the user preferences, and the one or more prioritization rules.

In another embodiment, as system may be provided. The system may include a means for receiving, from a user device, data via a non-WiFi network connection, wherein the data comprises authentication credentials for a WiFi network connection and a location associated with the user device; a means for identifying one or more wireless endpoints based at least in part on the location associated with the user device, wherein the one or more wireless endpoints comprise one or more access points, one or more WiFi controllers, or one or more authentication servers; a means for transmitting to the identified one or more access points, information associated with the user device and the authentication credentials; and a means for facilitating authentication of the user device with at least one of the identified one or more access points.

In one aspect of an embodiment, the non-WiFi network may be a cellular network. In one aspect of an embodiment, the location associated with the user device may be determined based at least in part on a signal strength associated with the user device or GPS data received from the user device. In one aspect of an embodiment, the system may further comprise a means for filtering the data received from the user device based on at least one of the location associated with the user device, proximity to the user device, previous associations with the user device, or movements associated with the user device. In one aspect of an embodiment, the non-WiFi connection may be established via a secure tunnel. In one aspect of an embodiment, the system may include a means for encrypting the information associated with the user device and the authentication credentials prior to transmitting to the identified one or more access points. In one aspect of an embodiment, the means for identifying the one or more access points based at least in part on the location associated with the user device may further include a means for retrieving, by the server, user preferences associated with the mobile device; a means for retrieving, by the server, one or more prioritization rules associated with the mobile device; and a means for identifying, by the server, the one or more access points based at least in part on the location associated with the user device, the user preferences, and the one or more prioritization rules.

In another embodiment, an apparatus may be provided. The apparatus may include at least one antenna; at least on transceiver; at least one memory storing computer-executable instructions; and at least one processor, wherein the at least one processor is configured to access the at least one memory and to execute the computer-executable instructions to receive, from a user device, data via a non-WiFi network connection, wherein the data comprises authentication credentials for a WiFi network connection and a location associated with the user device; identify one or more wireless endpoints based at least in part on the location associated with the user device, wherein the one or more wireless endpoints comprise one or more access points, one or more WiFi controllers, or one or more authentication servers; transmit to the identified one or more access points, information associated with the user device and the authentication credentials; and facilitate authentication of the user device with at least one of the identified one or more access points.

In one aspect of an embodiment, the non-WiFi network may be a cellular network. In one aspect of an embodiment, the location associated with the user device may be determined based at least in part on a signal strength associated with the user device or GPS data received from the user device. In one aspect of an embodiment, the at least one processor is configured to access the at least one memory and to execute the computer-executable instructions to filter the data received from the user device based on at least one of the location associated with the user device, proximity to the user device, previous associations with the user device, or movements associated with the user device. In one aspect of an embodiment, the non-WiFi connection may be established via a secure tunnel. In one aspect of an embodiment, the at least one processor is configured to access the at least one memory and to execute the computer-executable instructions to encrypt the information associated with the user device and the authentication credentials prior to transmitting to the identified one or more access points. In one aspect of an embodiment, to identify the one or more access points based at least in part on the location associated with the user device, the at least one processor is configured to access the at least one memory and to execute the computer-executable instructions to retrieve user preferences associated with the mobile device; retrieve one or more prioritization rules associated with the mobile device; and identify the one or more access points based at least in part on the location associated with the user device, the user preferences, and the one or more prioritization rules.

CONCLUSION

The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, can be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that can direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A non-transitory computer-readable medium storing computer-executable instructions which, when executed by a processor, cause the processor to perform operations comprising:
   receiving, from a user device, data via a non-WiFi network connection, wherein the data comprises authentication credentials for a WiFi network connection, a location associated with the user device, and a signal strength associated with user device;
   identifying a plurality of wireless endpoints based at least in part on the location associated with the user device and the signal strength, wherein the plurality of wireless endpoints comprise one or more access points, one or more WiFi controllers, or one or more authentication servers;
   determining information associated with the user device using the data received from the user device;
   determining a proximity of the user device to at least one of the plurality of wireless endpoints; and
   transmitting, to at least one of the plurality of wireless endpoints, based on the determined proximity, the determined information associated with the user device and the authentication credentials for authenticating the user device.

2. The computer-readable medium of claim 1, wherein the non-WiFi network is a cellular network.

3. The computer-readable medium of claim 1, wherein the location associated with the user device is determined based at least in part on the signal strength associated with the user device or GPS data received from the user device.

4. The computer-readable medium of claim 1, wherein the non-WiFi connection is established via a secure tunnel.

5. The computer-readable medium of claim 1, wherein the operations further comprise:
   encrypting the information associated with the user device and the authentication credentials prior to transmitting to the plurality of wireless endpoints.

6. The computer-readable medium of claim 1, wherein identifying the plurality of wireless endpoints based at least in part on the location associated with the user device further comprises:
   retrieving user preferences associated with the mobile device;
   retrieving one or more prioritization rules associated with the mobile device; and identifying the plurality of wireless endpoints based at least in part on the location associated with the user device, the user preferences, and the one or more prioritization rules.

7. A computer-implemented method comprising:

receiving, by a server comprising one or more processors from a user device, data via a non-WiFi network connection, wherein the data comprises authentication credentials for a WiFi network connection, a location associated with the user device, and a signal strength associated with user device;

identifying, by the server, a plurality of wireless endpoints based at least in part on the location associated with the user device and the signal strength, wherein the plurality of wireless endpoints comprise one or more access points, one or more WiFi controllers, or one or more authentication servers;

determining, by the server, information associated with the user device using the data received from the user device determining, by the server, a proximity of the user device to at least one of the plurality of wireless endpoints; and transmitting, by the server, to at least one of the plurality of wireless endpoints, based on the determined proximity, the determined information associated with the user device and the authentication credentials for authenticating the user device.

8. The computer-implemented method of claim 7, wherein the non-WiFi network is a cellular network.

9. The computer-implemented method of claim 7, wherein the location associated with the user device is determined based at least in part on a signal strength associated with the user device or GPS data received from the user device.

10. The computer-implemented method of claim 7, wherein the non-WiFi connection is established via a secure tunnel.

11. The computer-implemented method of claim 7, further comprising:

encrypting, by the server, the information associated with the user device and the authentication credentials prior to transmitting to the plurality of wireless endpoints.

12. The computer-implemented method of claim 7, wherein identifying the plurality of wireless endpoints based at least in part on the location associated with the user device further comprises:

retrieving, by the server, user preferences associated with the mobile device;

retrieving, by the server, one or more prioritization rules associated with the mobile device; and identifying, by the server, the plurality of wireless endpoints based at least in part on the location associated with the user device, the user preferences, and the one or more prioritization rules.

13. A system comprising:

at least one antenna;

at least on transceiver;

at least one memory storing computer-executable instructions; and at least one processor, wherein the at least one processor is configured to access the at least one memory and to execute the computer-executable instructions to:

receive, from a user device, data via a non-WiFi network connection, wherein the data comprises authentication credentials for a WiFi network connection, a location associated with the user device, and a signal strength associated with user device;

identify a plurality of wireless endpoints based at least in part on the location associated with the user device and the signal strength, wherein the plurality of wireless endpoints comprise one or more access points, one or more WiFi controllers, or one or more authentication servers;

determine information associated with the user device using the data received from the user device determine a proximity of the user device to at least one of the plurality of wireless endpoints; and transmit, to at least one of the plurality of wireless endpoints, based on the determined proximity, the determined information associated with the user device and the authentication credentials for authenticating the user device.

14. The system of claim 13, wherein the non-WiFi network is a cellular network.

15. The system of claim 13, wherein the location associated with the user device is determined based at least in part on a signal strength associated with the user device or GPS data received from the user device.

16. The system of claim 13, wherein the non-WiFi connection is established via a secure tunnel.

17. The system of claim 13, wherein the at least one processor is configured to access the at least one memory and to execute the computer-executable instructions to:

encrypt the information associated with the user device and the authentication credentials prior to transmitting to the plurality of wireless endpoints.

18. The system of claim 13, wherein to identify the plurality of wireless endpoints based at least in part on the location associated with the user device, the at least one processor is configured to access the at least one memory and to execute the computer-executable instructions to:

retrieve user preferences associated with the mobile device;

retrieve one or more prioritization rules associated with the mobile device; and identify the plurality of wireless endpoints based at least in part on the location associated with the user device, the user preferences, and the one or more prioritization rules.

* * * * *